US011551034B2

(12) United States Patent
Karimi et al.

(10) Patent No.: US 11,551,034 B2
(45) Date of Patent: Jan. 10, 2023

(54) ADVERSARIAL NETWORK FOR TRANSFORMING HANDWRITTEN TEXT

(71) Applicant: Ancestry.com Operations Inc., Lehi, UT (US)

(72) Inventors: Mostafa Karimi, College Station, TX (US); Gopalkrishna Veni, Lehi, UT (US); Yen-Yun Yu, Murray, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 107 days.

(21) Appl. No.: 17/065,763

(22) Filed: Oct. 8, 2020

(65) Prior Publication Data

US 2021/0110205 A1    Apr. 15, 2021

Related U.S. Application Data

(60) Provisional application No. 62/912,833, filed on Oct. 9, 2019.

(51) Int. Cl.
*G06K 9/62*    (2022.01)
*G06V 30/10*    (2022.01)

(52) U.S. Cl.
CPC ......... *G06K 9/6256* (2013.01); *G06K 9/6262* (2013.01); *G06V 30/10* (2022.01)

(58) Field of Classification Search
CPC .... G06K 9/6256; G06K 9/6262; G06V 30/10; G06V 30/226; G06V 30/40; G06V 30/32
See application file for complete search history.

(56) References Cited

U.S. PATENT DOCUMENTS

| 10,539,881 B1* | 1/2020 | Sha ..................... G03F 7/70433 |
| 2016/0188990 A1* | 6/2016 | Hosabettu .......... G06V 10/7515 |
| | | 382/177 |
| 2020/0349393 A1* | 11/2020 | Zhong ................... G06T 3/4053 |

OTHER PUBLICATIONS

Garcia-Salicetti et al. ("Adaptive Discrimination in an HMM-Based Neural Predictive System for On-Line Word Recognition", Proceedings of 13th International Conference on Pattern Recognition (vol. 4, pp. 515-519 vol. 4) (Year: 1996).*
Arjovsky, et. al., "Generative Adversarial Networks", In International Conference on Machine Learning, pp. 214—223, 2017.
Goodfellow, et. al., "Generative Adversarial Nets", In Advances of Neural Information Processing Systems, pp. 2672-2680, 2014.

(Continued)

*Primary Examiner* — Qian Yang
(74) *Attorney, Agent, or Firm* — Kilpatrick Townsend & Stockton LLP

(57) ABSTRACT

Described herein are systems, methods, and other techniques for training a generative adversarial network (GAN) to perform an image-to-image transformation for recognizing text. A pair of training images are provided to the GAN. The pair of training images include a training image containing a set of characters in handwritten form and a reference training image containing the set of characters in machine-recognizable form. The GAN includes a generator and a discriminator. The generated image is generated using the generator based on the training image. Update data is generated using the discriminator based on the generated image and the reference training image. The GAN is trained by modifying one or both of the generator and the discriminator using the update data.

14 Claims, 9 Drawing Sheets

(56) References Cited

OTHER PUBLICATIONS

Gulrajani, et. al., "Improved Training of Wassserstein Gans", In Advances in Neural Information Processing Systems, pp. 5767-5777, 2017.

Isola, et. al., "Image to Image Translation with Conditional Adversarial Networks", In Proceedings of the IEEE Conference on Computer Vision and Pattern Recognition, pp. 1125-1134, 2017.

Karras, et. al.. "Progressive Growing of Gans for Improved Quality, Stability, and Variation", arXiv preprint arXiv:1710.10196, 2017.

Mirza, et. al., "Conditional Generative Adversarial Nets", arXiv preprint arXiv:1411.1784, 2014.

Ronneberger., et. al., "U-net: Convolutional Networks for Biomedical Image Segmentation", In International Conference on Medical Image Computing and Computer Assisted Intervention, pp. 234-241, Springer, 2015.

Shi, et. al., "An End to End Trainable Neural Network for Image-Based Sequence Recognition and its Application to Scene Text Recognition", IEEE transactions on pattern analysis and machine intelligence, 39(11):22298-2304, 2016.

Wei, et al., "Improving the Improved Training of Wasserstein Gans: A Consistency Term and its Dual Effect", arXiv preprint arXiv:1803.01541, 2018.

Wu, et. al., "Sliced Wasserstein Generative Models", In Proceedings of the IEEE Conference on Computer Vision and Pattern Recognition, pp. 3713-3722, 2019.

International Search Report and Written Opinion dated Feb. 5, 2021 in related application No. PCT/US2020/054713, all pgs.

Chang, et. al.: "Chinese Typeface Transformation with Hierarchical Adversarial Network", arxiv.org, Cornell University Library, 201 Olin Library Cornell University Ithaca, NY 14853, Nov. 17, 2017 (Nov. 17, 2017), XP081289424, whole document.

Hayashi, et. al.,: "GlyphGAN: Style-Consistent Font Generation Based on Generative Adversarial Networks", arxiv.org, Cornell University Library, 201 Olin Library Cornell University Ithaca, NY 14853, May 29, 2019 (May 29, 2019), XP081365597, whole document.

Eman, et. al.,: "Cursive Script Textline Image Transformation for Improving OCR Accuracy", 2019 International Conference on Document Analysis and Recognition Workshops (I CDARW), IEEE, vol. 5, Sep. 22, 2019 (Sep. 22, 2019), pp. 59-64, XP033649175, DOI: 10.1109/ICDARW.2019.40082.

Wu, et. al.: "Image-to-Markup Generation via Paired Adversarial Learning", Jan. 18, 2019 (Jan. 18, 2019), Advances in Databases and Information Systems; [Lecture Notes in Computer Science; Lect.Notes Computer], Springer International Publishing, Cham, pp. 18-34, XP047500585,ISBN: 978-3-319-10403-4.

\* cited by examiner

ADVERSARIAL NETWORK FOR TRANSFORMING HANDWRITTEN TEXT

CROSS-REFERENCES TO RELATED APPLICATIONS

This application claims the benefit of priority to U.S. Provisional Patent Application No. 62/912,833 filed Oct. 9, 2019, entitled "ILLEGIBLE TEXT TO READABLE TEXT: AN IMAGE-TO-IMAGE TRANSFORMATION," the contents of which are herein incorporated in their entirety.

BACKGROUND OF THE INVENTION

Text recognition from handwritten record images is an important problem in the genealogy domain. Accurate and efficient text recognition can help genealogists discover and unlock family history. Automating the text recognition process would further benefit them in saving time, manual labor, and the associated cost. However, many document images suffer from challenges including varying noise conditions, interfering annotations, typical record artifacts like fading and vanishing texts, and variations in handwriting, each of which make it difficult to transcribe. Over the past decade, various approaches have been proposed to solve document analysis and recognition such as optical character recognition (OCR), layout analysis, text segmentation, and handwriting recognition. Although OCR models have been very successful in recognizing machine print text, they stumble upon handwriting recognition due to the aforementioned challenges, as well as the difficulty of connecting characters in the text as compared to machine print ones where the characters are easily separable.

Handwriting image recognition is traditionally divided into two groups: online recognition and offline recognition. In the online case, the time series of coordinates representing the movement of the writing utensil tip is captured, whereas in offline recognition the image of the text is available. Several computer vision and machine learning algorithms have been proposed to solve various challenges of handwriting recognition, but the problem is far from being solved. Some standard handwriting recognition approaches include hidden Markov models (HMM), support vector machines (SVM), and sequential networks including recurrent neural networks (RNN) and its variants.

Sequential networks have outperformed SVM and MINI models in handwriting recognition tasks. Long short term memory (LSTM) networks are a type of RNN that propagate sequential information for long periods of time and have been widely applicable in handwriting recognition tasks. Multidimensional RNNs are another type of sequential networks that have been widely used in modern handwritten text recognition tasks. Annotating handwritten text at a character level is a challenging task. Connectionist Temporal Classification (CTC) has been developed that avoids calculating the loss of sequential networks at the character level. Further, CTC-based networks may not require post-processing of the recognized text. As such, sequential networks with CTC loss have gained a lot of attention in handwriting recognition tasks.

Generative adversarial networks (GANs) have proven to be successful generative models in many computer vision tasks. A GAN model formulates a generative model as a game theory minimax game between generator and discriminator models. The generator model tries to generate "fake" samples as close to the real ones and the discriminator model tries to discriminate "fake" samples from real ones. An extension of the GAN is the conditional GAN, where the sample generation is conditioned upon an input, which can be a discrete label, a text, or an image. In some instances, a GAN can utilize a conditional GAN framework and a U-Net architecture for its generator and discriminator models. This approach tends to capture hierarchical features inside images. Although GAN models are successful in generating fascinating and realistic images, they can be hard to train due to their low-dimensional support, vanishing gradient, mode collapsing issues, and their difficulty in achieving Nash equilibrium.

Many GANs employ either the Kullback-Leibler (KL) or the Jensen-Shannon (JS) divergence to model loss functions, which can give rise to mode collapsing, gradient vanishing, and low-dimensional support problems in a high-dimensional space. The Wasserstein distance (WD) has gained attention in computer vision and machine learning community due to its continuous and differentiable nature, which can overcome the above-mentioned problems. In some instances, a Wasserstein GAN (WGAN) which uses the Wasserstein-1 (earth mover) distance to learn probability distributions can be employed. One issue with the Wasserstein-1 distance is that its primal form can be intractable and it is hard to enforce the Lipschitz continuity constraint in its dual form. To circumvent this, the sliced Wasserstein Distance (SWD) can be used due to the Wasserstein distance providing a closed-form solution for one-dimensional probability densities. Previously, the SWD has been utilized for dimensionality reduction, clustering, and learning Gaussian mixture models. Recently, it has been employed in generative models such as sliced Wasserstein generative models and sliced Wasserstein autoencoders. The SWD factorizes high-dimensional probabilities to multiple marginal distributions. Theoretically, the SWD can compute infinitely many linear projections of a high-dimensional distribution to one-dimensional distributions followed by computing the average Wasserstein distance of these one-dimensional distributions.

BRIEF SUMMARY OF THE INVENTION

Embodiments described herein relate broadly to image transformation and text recognition techniques. In particular, some embodiments relate to machine learning models that may be trained to perform image-to-image transformations for the purpose of providing the resulting images to optical character recognizers for extracting text. The machine learning models used may be generative adversarial networks (GANs).

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of training a GAN to perform an image-to-image transformation for recognizing text, the method comprising: providing a pair of training images to the GAN, the pair of training images including a training image containing a set of characters in handwritten form and a reference training image containing the set of characters in machine-recognizable form, wherein the GAN includes a generator and a discriminator; providing the training image to the generator; generating, using the generator, a generated image based on the training image; providing the generated image and the reference training image to the discriminator; generating, using the discriminator, update data based on the generated image and the reference training image; and training the GAN by modifying one or both of the generator and the discriminator using the update data.

Example 2 is the method of example(s) 1, wherein the discriminator is a word-level discriminator, and wherein the update data is word-level update data.

Example 3 is the method of example(s) 1-2, wherein the GAN further includes a character-level discriminator.

Example 4 is the method of example(s) 1-3, further comprising: separating the generated image for each of the set of characters; and separating the reference training image for each of the set of characters.

Example 5 is the method of example(s) 1-4, further comprising: providing the separated generated image and the separated reference training image to the character-level discriminator; generating, using the character-level discriminator, character-level update data based on the separated generated image and the separated reference training image; and training the GAN by modifying one or both of the generator and the character-level discriminator using the character-level update data.

Example 6 is the method of example(s) 1-5, wherein the generator is further provided with a random input, and wherein the generated image is generated further based on the random input.

Example 7 is the method of example(s) 1-6, further comprising: providing additional pairs of training images; generating additional update data using the additional pairs of training images; and training the GAN by modifying one or both of the generator and the discriminator using the additional update data.

Example 8 is a non-transitory computer-readable medium comprising instructions that, when executed by one or more processors, cause the one or more processors to perform operations comprising: providing a pair of training images to a GAN, the pair of training images including a training image containing a set of characters in handwritten form and a reference training image containing the set of characters in machine-recognizable form, wherein the GAN includes a generator and a discriminator; providing the training image to the generator; generating, using the generator, a generated image based on the training image; providing the generated image and the reference training image to the discriminator; generating, using the discriminator, update data based on the generated image and the reference training image; and training the GAN by modifying one or both of the generator and the discriminator using the update data.

Example 9 is the non-transitory computer-readable medium of example(s) 8, wherein the discriminator is a word-level discriminator, and wherein the update data is word-level update data.

Example 10 is the non-transitory computer-readable medium of example(s) 8-9, wherein the GAN further includes a character-level discriminator.

Example 11 is the non-transitory computer-readable medium of example(s) 8-10, further comprising: separating the generated image for each of the set of characters; and separating the reference training image for each of the set of characters.

Example 12 is the non-transitory computer-readable medium of example(s) 8-11, further comprising: providing the separated generated image and the separated reference training image to the character-level discriminator; generating, using the character-level discriminator, character-level update data based on the separated generated image and the separated reference training image; and training the GAN by modifying one or both of the generator and the character-level discriminator using the character-level update data.

Example 13 is the non-transitory computer-readable medium of example(s) 8-12, wherein the generator is further provided with a random input, and wherein the generated image is generated further based on the random input.

Example 14 is the non-transitory computer-readable medium of example(s) 8-13, further comprising: providing additional pairs of training images; generating additional update data using the additional pairs of training images; and training the GAN by modifying one or both of the generator and the discriminator using the additional update data.

Example 15 is a system comprising: one or more processors; and a computer-readable medium comprising instructions that, when executed by the one or more processors, cause the one or more processors to perform operations comprising: providing a pair of training images to a GAN, the pair of training images including a training image containing a set of characters in handwritten form and a reference training image containing the set of characters in machine-recognizable form, wherein the GAN includes a generator and a discriminator; providing the training image to the generator; generating, using the generator, a generated image based on the training image; providing the generated image and the reference training image to the discriminator; generating, using the discriminator, update data based on the generated image and the reference training image; and training the GAN by modifying one or both of the generator and the discriminator using the update data.

Example 16 is the system of example(s) 15, wherein the discriminator is a word-level discriminator, and wherein the update data is word-level update data.

Example 17 is the system of example(s) 15-16, wherein the GAN further includes a character-level discriminator.

Example 18 is the system of example(s) 15-17, further comprising: separating the generated image for each of the set of characters; and separating the reference training image for each of the set of characters.

Example 19 is the system of example(s) 15-18, further comprising: providing the separated generated image and the separated reference training image to the character-level discriminator; generating, using the character-level discriminator, character-level update data based on the separated generated image and the separated reference training image; and training the GAN by modifying one or both of the generator and the character-level discriminator using the character-level update data.

Example 20 is the system of example(s) 15-19, further comprising: providing additional pairs of training images; generating additional update data using the additional pairs of training images; and training the GAN by modifying one or both of the generator and the discriminator using the additional update data.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1:
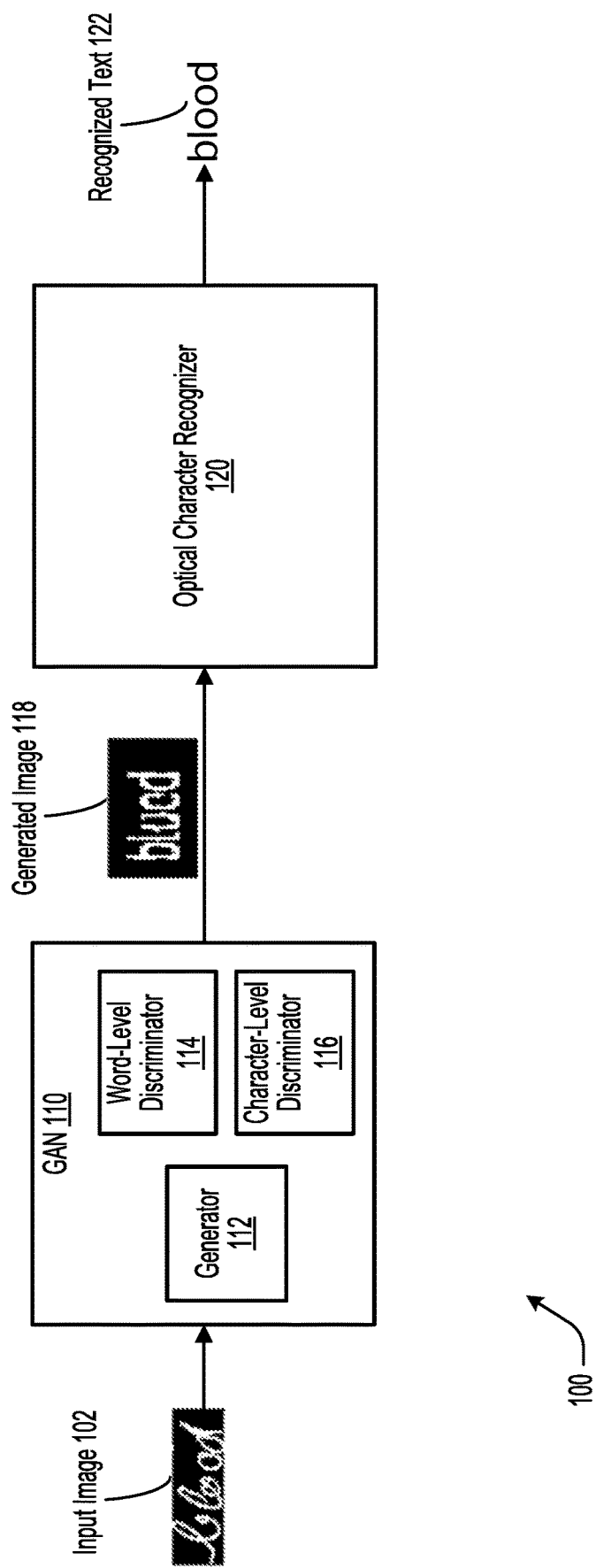
FIG. 1 illustrates an example of a system for generating recognized text based on an input image.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Some embodiments of the present invention relate to a novel conditional sliced Wasserstein generative adversarial network (GAN) with three components, including a generator, a word-level discriminator, and a character-level discriminator. These components can be used to translate handwritten text images to corresponding machine print forms. Unlike standard techniques that transcribe handwriting images by treating them as either a classification or segmentation problem, depending upon the context, some embodiments of the present invention formulate handwriting recognition as a text-image-to-text-image translation problem where a given image, typically in an illegible form, is transformed into an another image that is closer to machine-print form. The transformed image can then be easily transcribed using optical character recognition (OCR)-like techniques. Benefits of the described technique is that high-quality results can be achieved even on extremely challenging handwriting images.

In some instances, a GAN comprises (1) a generator network that tries to map latent space (noise) to the true data distribution while generating fake samples resembling the real ones and (2) a discriminator network that tries to distinguish true samples from the fake ones. Both networks compete against each other until they reach equilibrium. GANs can inherently suffer from major challenges including non-convergence, mode collapse, and a vanishing gradient problem. A variant of the GAN, called the sliced Wasserstein GAN (WGAN), has been introduced to address these challenges. Some embodiments of the present invention utilize a modified version of the sliced WGAN to translate handwritten text images. Some embodiments of the present invention utilize a U-Net architecture inside the generator to capture low-level as well as abstract features. For the discriminator component, some embodiments account for both word-level and character-level errors and underlying high-dimensional distributions leveraged by the Wasserstein distance with slice sampling to transcribe a given text.

In some instances, a GAN can be represented using a minimax game framework. As such, its objective function can be written as:

$$\min_G \max_D \mathbb{E}_{x \sim \mathbb{P}_r}[\log(D(x))] + \mathbb{E}_{\tilde{x} \sim \mathbb{P}_g}[\log(1 - D(\tilde{x}))] \quad (1)$$

where G represents a generator, D represents a discriminator, and x is the realization of true samples. $\mathbb{P}_r$ is the true data distribution and $\mathbb{P}_g$ denotes the generator's distribution that is modeled implicitly by $\tilde{x} \sim G(z)$ and $z \sim \mathbb{P}(z)$ (the latent space or noise z can be sampled from a uniform distribution or a spherical Gaussian distribution).

Training a GAN network can correspond to minimizing the Jensen-Shannon (JS) divergence between $\mathbb{P}_r$ and $\mathbb{P}_g$ if the discriminator is trained to optimality before each generator's update. However, it has been observed that Eq. (1) tends to suffer from the gradient vanishing problem as the discriminator saturates. Although the generator's loss function can be replaced by maximizing $$\mathbb{E}_{z \sim \mathbb{P}(z)}[\log(D(G(z)))],$$

the gradient vanishing problem is far from being solved.

In some instances, the GAN has been extended to the conditional GAN (CGAN), where both the generator and the discriminator are conditioned on a given additional supervised event y, where y can be any kind of auxiliary information or data such as a discrete label, text, and image. Usually, the CGAN is performed by feeding y into both the discriminator and the generator as an additional input layer. In some instances, the CGAN is formulated as:

$$\min_G \max_D \mathbb{E}_{x \sim \mathbb{P}_r}[\log(D(x|y))] + \mathbb{E}_{\tilde{x} \sim \mathbb{P}_g}[\log(1 - D(\tilde{x}|y))] \quad (2)$$

where $\mathbb{P}_g$, the generator's distribution, is explicitly modeled as $\tilde{x} \sim G(z|y)$ and $z \sim \mathbb{P}(z)$ in the CGAN.

The Wasserstein distance (WD) is a powerful metric in the field of optimal transport and has recently drawn a lot of attention. It measures the distance between two distributions. The p-Wasserstein distance between two random variables X, Y is given as:

$$W_p = \inf_{\gamma \in \Gamma(\mathbb{P}_X, \mathbb{P}_Y)} \mathbb{E}_{(x,y) \sim \gamma}[d^p(x, y)]^{\frac{1}{p}} \quad (3)$$

where $\Gamma(\mathbb{P}_X, \mathbb{P}_Y)$ denotes a set of all joint distributions $\gamma(X, Y)$ whose marginal distributions are $\mathbb{P}_X$, $\mathbb{P}_Y$. Suppose x and y are realizations or samples from random variables X and Y, respectively. Let p>0, then d (x, y) defines a metric for x and y. For p=1, 1−WD d(x, y) is referred to as the Earth-Mover distance (EMD). Intuitively, $\gamma(X, Y)$ shows how much "mass" is going to be transported from any realization of X to any realization of Y in order to transport the distribution $\mathbb{P}_X$ to the distribution $\mathbb{P}_Y$. Because the primal form of the 1-WD is generally intractable and usually the dual form is used in practice, a dual form of the EMD is formulated through the Kantorovich-Rubinstein (KR) duality and is given as:

$$W_1 = \sup_{\|g\|_L \le 1} \mathbb{E}_{x \sim \mathbb{P}_X}[g(x)] - \mathbb{E}_{y \sim \mathbb{P}_Y}[g(y)] \quad (4)$$

where the supremum is over all 1-Lipschitz functions g(•).

One challenge in applying the WD to GANs is that the WD is a much weaker distance compared to the JS distance, e.g., it induces a weaker topology. This fact makes a sequence of probability distributions converge in the distribution space, which results in bringing the model distribution closer to the real distribution. In other words, both the low-dimensional support challenge in high dimensions and the gradient vanishing problem can be solved under this assumption. Due to these reasons, the WGAN model has been developed based on the dual form of the EMD. The WGAN with generator G and discriminator D is formulated as the first term of Eq. (5). The main challenge in the WGAN is to satisfy the Lipschitz continuity constraint. The original WGAN considered a weighted clipping approach that limits the capacity of the model and its performance. To alleviate this problem, the WGAN with gradient penalty (WGAN-GP) has been developed that penalizes the norm of the discriminator's gradient with respect to a few input samples. The gradient penalty $$GP = \mathbb{E}_{\hat{x} \sim \mathbb{P}_{\hat{x}}}\left[(\|\nabla_{\hat{x}} D(\hat{x})\|_2 - 1)^2\right]$$

is added to the original WGAN loss function in Eq. (5). Therefore, the WGAN-GP is formulated as:

$$\min_G \max_{\|D\|_L \le 1} \mathbb{E}_{x \sim \mathbb{P}_r}[D(x)] - \mathbb{E}_{y \sim \mathbb{P}_g}[D(y)] + \lambda GP \quad (5)$$

where $\hat{x}$ represents random samples following the distribution $\mathbb{P}_{\hat{x}}$, which is formed by uniformly sampling along the straight lines between a pair of points sampled from $\mathbb{P}_r$ and $\mathbb{P}_g$. $\lambda$ is the hyper-parameter to balance between original WGAN loss function and the gradient penalty regularization. Recently, the WGAN has been further improved by adding a consistency term GAN (CTGAN).

The WD is generally intractable for multi-dimensional probability distributions. However, a closed-form solution is available (i.e., the WD is tractable) if the distribution is in the low-dimensional space. Let $F_X$ and $F_Y$ be the cumulative distribution function (CDF) for probability distributions $\mathbb{P}_X$ and $\mathbb{P}_Y$, respectively. The WD between these two distributions is uniquely defined as $F_Y^{-1}(F_X(x))$. The primal p-WD between them can be re-defined as:

$$W_p = \left(\int_0^1 d^p(F_X^{-1}(z), F_Y^{-1}(z))dz\right)^{\frac{1}{p}} \quad (6)$$

The change of variable z: $=F_X(x)$ is used to derive the equation. For empirical distributions, Eq. (6) is calculated by sorting the two distributions and then calculating the average distance $d^p(\cdot,\cdot)$ between two sorted samples which corresponds to O(M) at best and O(M log M) at worst, where M is the number of samples for each distribution.

The Sliced Wasserstein distance (SWD) utilizes this property by factorizing high-dimensional probabilities to multiple marginal distributions with the standard Radon transform, denoted by $\mathcal{R}$. Given any distribution P(•), the Radon transform of P(•) is defined as:

$$\mathcal{R}P(t,\theta) = \int_{\mathbb{R}^d} \mathbb{P}(x)\delta(t - \langle \theta, x \rangle)dx \quad (7)$$

where $\delta(\cdot)$ is the one-dimensional Dirac delta function and $\langle \cdot,\cdot \rangle$ is the Euclidean inner-product. The hyper-parameters in the Radon transform include a level set parameter $t \in \mathbb{R}$ and a normal vector $\theta \in \mathbb{S}^{d-1}$ ($\theta$ is a unit vector, and $\mathbb{S}^{d-1}$ is the unit hyper-sphere in d-dimensional space). The Radon transform $\mathcal{R}$ maps a function to the infinite set of its integrals over hyperplanes $\langle \theta, x \rangle$ of $\mathbb{R}^d$. For a fixed $\theta$, the integrals over all hyperplanes define a continuous function $\mathcal{R}P(\cdot, \theta): \mathcal{R} \to \mathcal{R}$ which is a slice or projection of P. The p-WD in Eq. (6) can be rewritten as the sliced p-WD for a pair of distributions $\mathbb{P}_X$ and $\mathbb{P}_Y$ as:

$$SW_p = \left(\int_{\theta \in \mathbb{S}^{d-1}} W_p(\mathcal{R}P_X(.,\theta), \mathcal{R}P_Y(.,\theta))d\theta\right)^{\frac{1}{p}} \quad (8)$$

The dual of Eq. (8) can be derived based on the KR duality as:

$$SW_p = \left(\int_{\theta \in \mathbb{S}^{d-1}} \sup_{\|g\|_L \le 1} \mathbb{E}_{x_\theta}[g(x_\theta)] - \mathbb{E}_{y_\theta}[g(y_\theta)]d\theta\right)^{\frac{1}{p}} \quad (9)$$

where $x_\theta$ and $y_\theta$ are sampled from $\mathcal{R}P_X(\cdot, \theta)$ and $\mathcal{R}P_Y(\cdot, \theta)$, respectively. The SWD is not only a valid distance which satisfies positive-definiteness, symmetry, and the triangle inequality, but is also equivalent to the WD based on the following. The inequality below holds for the SWD and the WD where $\alpha_1$ and $\alpha_2$ are constants and n is the dimension of sample vectors from X and Y:

$$SW_p(\mathbb{P}_X, \mathbb{P}_Y)^p \le \alpha_1 W_p(\mathbb{P}_X, \mathbb{P}_Y)^p \le \alpha_2 SW_p(\mathbb{P}_X, \mathbb{P}_Y)^{\frac{1}{n+1}}$$

The sliced Wasserstein generative adversarial network (SWGAN) has been proposed by utilizing the dual form of the WGAN and approximating the SWD in generative models. The discriminator is composed of an encoding network E and M dual SWD blocks $\{S_m\}_{m=1}^M$, that is, D := $\{S_m \circ E\}_{m=1}^M = [S_1 \circ E, \ldots, S_M \circ E]^T$, where the operation $S_i \circ E = S_i(E(\cdot))$. The encoder E: $\mathcal{R}^{b \times n} \to \mathcal{R}^{b \times r}$ maps a batch of data $X \in \mathcal{R}^{b \times n}$ to the latent space of $X^{embd} \in \mathcal{R}^{b \times r}$ where b is the batch size, n is the data dimension and r is the latent dimension. The first part of each dual SWD block can operate on the orthogonalization operation $X^{orth} = X^{embd}\Theta$ with $\Theta \in \mathcal{R}^{r \times r}$ to make sure that the encoded matrix is orthogonal. The second part of each dual SWD block will perform an element-wise non-linear neural network function $T_i(x_i^{orth}) = u_i \text{LeakyReLU}(w_i x_i^{orth} + b_i)$ to approximate the one-dimensional optimal g function in Eq. (9) for all i=1, . . . , r where $u_i$, $w_i$, and $b_i$ are scalar parameters. Eventually, the model can be approximated by integrating over $\mathbb{S}^{n-1}$ and summing the output mean value of the dual SWD blocks.

The Lipschitz constraint can be easily applied over one-dimensional functions followed by the gradient penalty on each dimension of $T_i$'s. The projection matrices should remain orthogonal throughout the training process. Accordingly, a manifold-valued update rule has been developed based on the Stiefel manifolds. The SWGAN's final objective function is as follows:

$$\min_{G}\max_{D} \int_{\theta \in \mathbb{S}^{n-1}} \left( \underset{x \sim \mathbb{P}_r}{\mathbb{E}} [D(x)] - \underset{y \sim \mathbb{P}_g}{\mathbb{E}} [D(y)] d\theta \right) + \qquad (10)$$

$$\lambda_1 \underset{\hat{x} \sim \mathbb{P}_{\hat{x}}}{\mathbb{E}} \left[ \|\nabla_{\hat{x}} D(\hat{x})\|_2^2 \right] + \lambda_2 \underset{\tilde{y} \sim \mathbb{P}_{\tilde{y}}}{\mathbb{E}} \left[ (\|\nabla_{\tilde{y}} T(\tilde{y}) - 1\|_2^2 \right]$$

where θ represents trainable parameters embedded in D, 1 is a vector with all entries equal to 1, and $\lambda_1$ and $\lambda_2$ are the hyper-parameters for balancing the gradient penalty terms and dual SWD.

FIG. 1 illustrates an example of a system 100 for generating recognized text 122 based on an input image 102, according to some embodiments of the present invention. System 100 includes a GAN 110 and an optical character recognizer 120. GAN 110 includes a generator 112, a word-level discriminator 114, and a character-level discriminator 116. GAN 110 is trained by modifying/training one or more of generator 112, word-level discriminator 114, and character-level discriminator 116 using prepared image pairs. During runtime, GAN 110 is provided with input image 102, which may include a set of characters in handwritten form. As used herein, "characters" refer to alphabetic characters (e.g., letters), numerical digits (e.g., numbers), special characters and common punctation (e.g. &, %, /, $, . . . ), and whitespace.

Based on input image 102, GAN 110 (e.g., generator 112) generates a generated image 118, which may include a set of characters in machine-recognizable form. The set of characters in generated image 118 may be the same set of characters in input image 102. Optical character recognizer 120 then analyzes generated image 118 to generate recognized text 122, which includes data (e.g., ASCII codes) representing the set of characters.

GAN 110 may be referred to herein as a handwritten-to-machine print GAN (HW2MP-GAN), and may be utilized for preprocessing and converting handwritten text images to machine print ones. For a conditional GAN model, a three-component game is considered between a single generator, generator 112, and two discriminators, word-level discriminator 114 and character-level discriminator 116. In this way, the two discriminators are able to work together and help the generator in generating clear words and characters in the correct order.

Character-level discriminator 116 forces each generated character to be similar to real machine print characters. Since the number of characters, symbols, and numbers in English is limited, character-level discriminator 116 learns to generate each one of these characters correctly. Word-level discriminator 114 forces generated words to be similar to the real ones. Since the number of combination of all characters, symbols, and numbers is exponential to the length of the word, word-level discriminator performs the more complex task of enforcing the correct order from the generated characters. As such, the two discriminators are hierarchically helping each other to generate words.

With respect to character-level discriminator 116, suppose that real and generated machine print images are x and $\tilde{x}$, respectively, and that there are $K_X$ characters in the image x. Then, the real and generated machine print characters are defined as $\{x_k^c\}_{k=1}^{K_x}$ and $\{\tilde{x}_k^c\}_{k=1}^{K_x}$, respectively. Superscripts c and w are used for character-level and word-level, respectively. $x_k^c$ and $\tilde{x}_k^c$ represent the $k^{th}$ character of word x and $\tilde{x}$, respectively. The character-level discriminator can be defined as $D^c := \{S_m^c \circ E^c\}_{m=1}^{M^c}$ where $E^c$ is the character-level encoder, $S_m^c$ is the $m^{th}$ SWD block, and $M^c$ is the number of SWD blocks for the character-level discriminator. Therefore, the character-level loss function can be formulated as:

$$L^c = \int_{\theta^c \in \mathbb{S}^{r^c - 1}} \underset{x_k^c \sim \mathbb{P}_r^c}{\mathbb{E}} [D^c(x_k^c)] - \underset{\tilde{x}_k^c \sim \mathbb{P}_g^c}{\mathbb{E}} [D^c(\tilde{x}_k^c)] + \qquad (11)$$

$$\lambda_1^c \underset{\hat{x}_k^c \sim \mathbb{P}_{\hat{x}}^c}{\mathbb{E}} \left[ \|\nabla_{\hat{x}_k^c} D^c(\hat{x}_k^c)\|_2^2 \right] + \lambda_2^c \underset{\overline{x}_k^c \sim \mathbb{P}_{\overline{x}}^c}{\mathbb{E}} \left[ \|\nabla_{\overline{x}_k^c} T^c(\overline{x}_k^c) - 1\|_2^2 \right]$$

where the real machine print character distribution is $\mathbb{P}_r^c$ and the generated machine print character distribution is $\mathbb{P}_g^c$. $\theta^c$ represent learnable parameters and are embedded in the character discriminator $D^c$. The last two terms of Eq. (11) are gradient and Lipschitz regularization terms, where hyper-parameters $\lambda_1^c$ and $\lambda_2^c$ are balancing between the sliced Wasserstein GAN's loss function and its regularization terms, and 1 is the vector of all ones. The gradient and Lipschitz regularization are enforced according to the $\mathbb{P}_{\hat{x}}^c$ and $\mathbb{P}_{\overline{x}}^c$ distributions which are sampled across the lines between $\mathbb{P}_r^c$ and $\mathbb{P}_g^c$ (convex combination of the samples between $\mathbb{P}_r^c$ and $\mathbb{P}_g^c$).

With respect to word-level discriminator 114, similar to character-level discriminator 116, the word-level discriminator is defined as $D^w := \{S_m^w \circ E^w\}_{m=1}^{M^w}$ where the $E^w$ is word-level encoder, $S_m^w$ is $m^{th}$ SWD block, and $M^w$ is the number of SWD blocks. Therefore, the word-level loss function can be formulated as:

$$L^w = \int_{\theta^w \in \mathbb{S}^{n-1}} \underset{x \sim \mathbb{P}_r}{\mathbb{E}} [D^w(x|y)] - \underset{\tilde{x} \sim \mathbb{P}_g}{\mathbb{E}} [D^w(x|y)] + \qquad (12)$$

$$\lambda_1^w \underset{\hat{x} \sim \mathbb{P}_{\hat{x}}}{\mathbb{E}} \left[ \|\nabla_{\hat{x}} D^w(\hat{x}|y)\|_2^2 \right] + \lambda_2^w \underset{\overline{x} \sim \mathbb{P}_{\overline{x}}}{\mathbb{E}} \left[ \|\nabla_{\overline{x}} T^w(\overline{x}) - 1\|_2^2 \right]$$

where the real machine print word distribution is $\mathbb{P}_r$ and the generated machine print word distribution is $\mathbb{P}_g$. $\theta^w$ represent learnable parameters and are embedded in the word discriminator $D^w$. The last two terms are the gradient and Lipschitz regularization terms where hyper-parameters $\lambda_1^w$ and $\lambda_2^w$ are balancing between the sliced Wasserstein GAN's loss function and its regularization terms. Similarly, the gradient and Lipschitz regularization are enforced according to the $\mathbb{P}_{\hat{x}}$ and $\mathbb{P}_{\overline{x}}$ distributions.

A final loss function can be calculated by combining the character-level model, Eq. (11), and the word-level model, Eq. (12), with the reconstruction loss, which is the $l_1$ norm between generated images $\tilde{x}$ and real images x. The objective function of the HW2MP-GAN can be expressed as:

$$L^{total} = L^w + \lambda_{char} L^c + \lambda_{recons} \underset{\substack{x \sim \mathbb{P}_r \\ x \sim \mathbb{P}_g}}{\mathbb{E}} \|\tilde{x} - x\|_1 \qquad (13)$$

where $\lambda_{char}$ and $\lambda_{recons}$ are hyper-parameters for balancing between the word-level loss, the character-level loss, and the reconstruction loss functions. To assure that the projection matrices are orthogonal during training for both the character-level and the word-level discriminators, the Steifel manifold can be followed.

Figure 2:
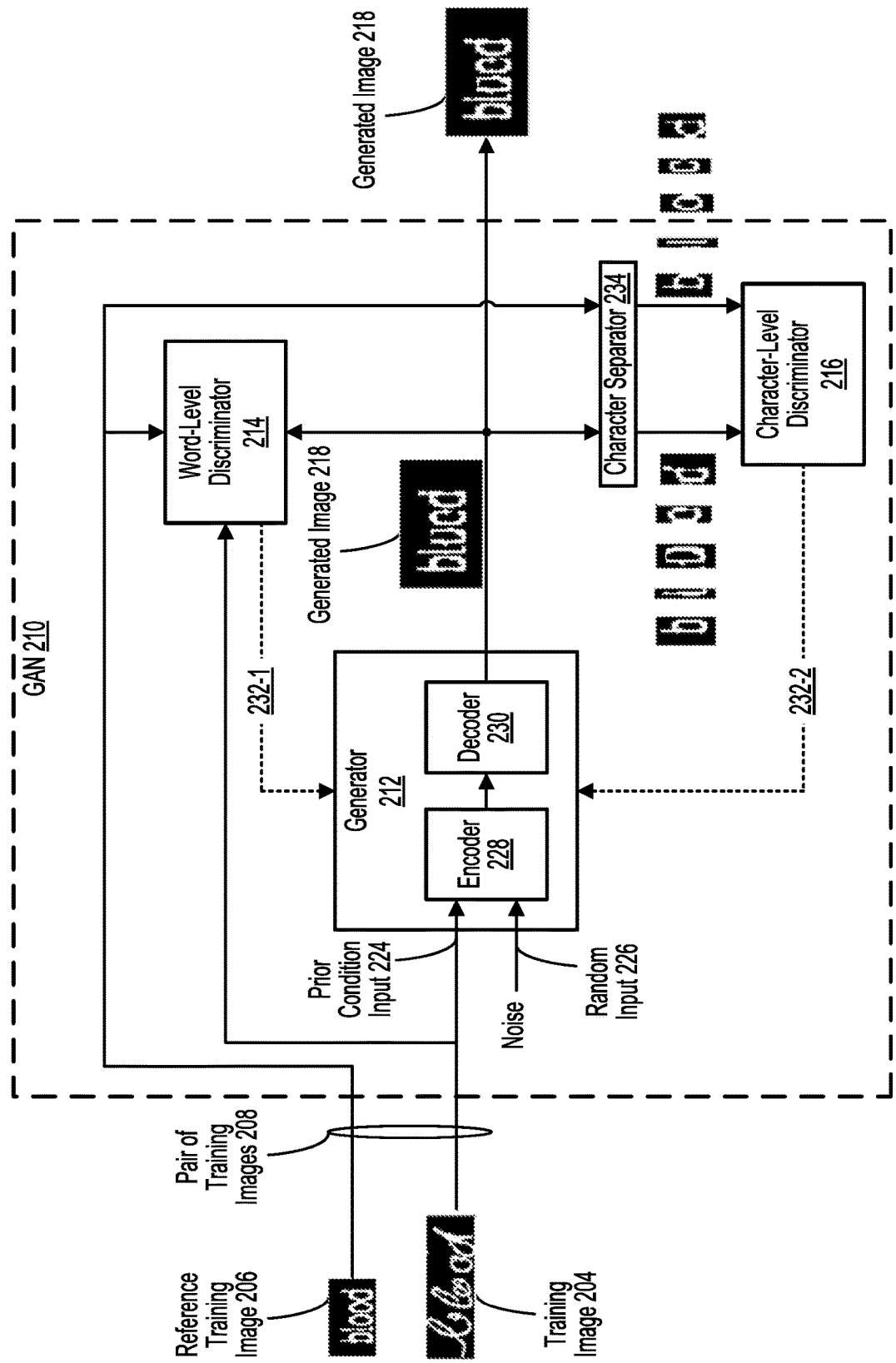
FIG. 2 illustrates an example of a generative adversarial network (GAN).

FIG. 2 illustrates an example of a GAN 210, according to some embodiments of the present invention. During training, a pair of training images 208 are provided to GAN 210. While a single pair of training images is shown in FIG. 2 for purposes of clarity, it should be understood that multiple pairs of training images from one or more batches of image pairs may be sequentially provided to GAN 210 to train one or more of generator 212, word-level discriminator 214, and character-level discriminator 216. For example, during a first training iteration, a first batch of image pairs (handwritten and machine print images) from a training set may be provided. Thereafter, during a second training iteration, a second batch of image pairs with replacement from the training set may be provided. Similarly, during a third training iteration, a third batch of image pairs with replacement from the training set may be provided.

In some implementations, different components of GAN 210 may be trained during different training iterations. For example, during the first training iteration, the first batch of image pairs may be provided to GAN 210 for training generator 212. Thereafter, during the second training iteration, the second batch of image pairs may be provided to GAN 210 for training word-level discriminator 214. Thereafter, during the third training iteration, the third batch of image pairs may be provided to GAN 210 for training character-level discriminator 216. Alternatively, one or more of the batches of image pairs may be used to simultaneously train all three of (or two of) generator 212, word-level discriminator 214, and character-level discriminator 216. Other possibilities are contemplated.

Pair of training images 208 includes a training image 204 and a reference training image 206. Training image 204 may include a set of characters in handwritten form, and reference training image 206 may include a corresponding set of characters (e.g., the same set of characters) in machine-recognizable form. Generator 212, which includes an encoder 228 and a decoder 230, receives training image 204 as a prior condition input 224. Generator 212 may additionally receive noise or another random signal as a random input 226. Based on training image 204 (and optionally random input 226), generator 212 may generate a generated image 218, which may also include the same set of characters as training image 204 and reference training image 206. Generated image 218 may be fed into each of word-level discriminator 214 and character-level discriminator 216. Prior to providing generated image 218 to character-level discriminator 216, each of the set of characters in generated image 218 may be separated from each other by a character separator 234.

Reference training image 206 may be fed into word-level discriminator 214 and character-level discriminator 216. Prior to providing reference training image 206 to character-level discriminator 216, each of the set of characters in reference training image 206 may be separated from each other by character separator 234. Word-level discriminator 214 may receive reference training image 206, generated image 218, and (optionally) training image 204, and may generate word-level update data 232-1 based on these inputs. For example, in some embodiments, word-level discriminator 214 may compare generated image 218 to reference training image 206 to determine the similarity between the two. If generated image 218 and reference training image 206 have a low level of similarity, word-level discriminator 214 may generate word-level update data 232-1 so as to cause significant modifications to generator 212. In contrast, if generated image 218 and reference training image 206 have a high level of similarity, word-level discriminator 214 may generate word-level update data 232-1 so as to cause much less significant modifications to generator 212. Character-level discriminator 216 may receive reference training image 206 and generated image 218, and may generate character-level update data 232-2 based on these inputs.

Figure 3:
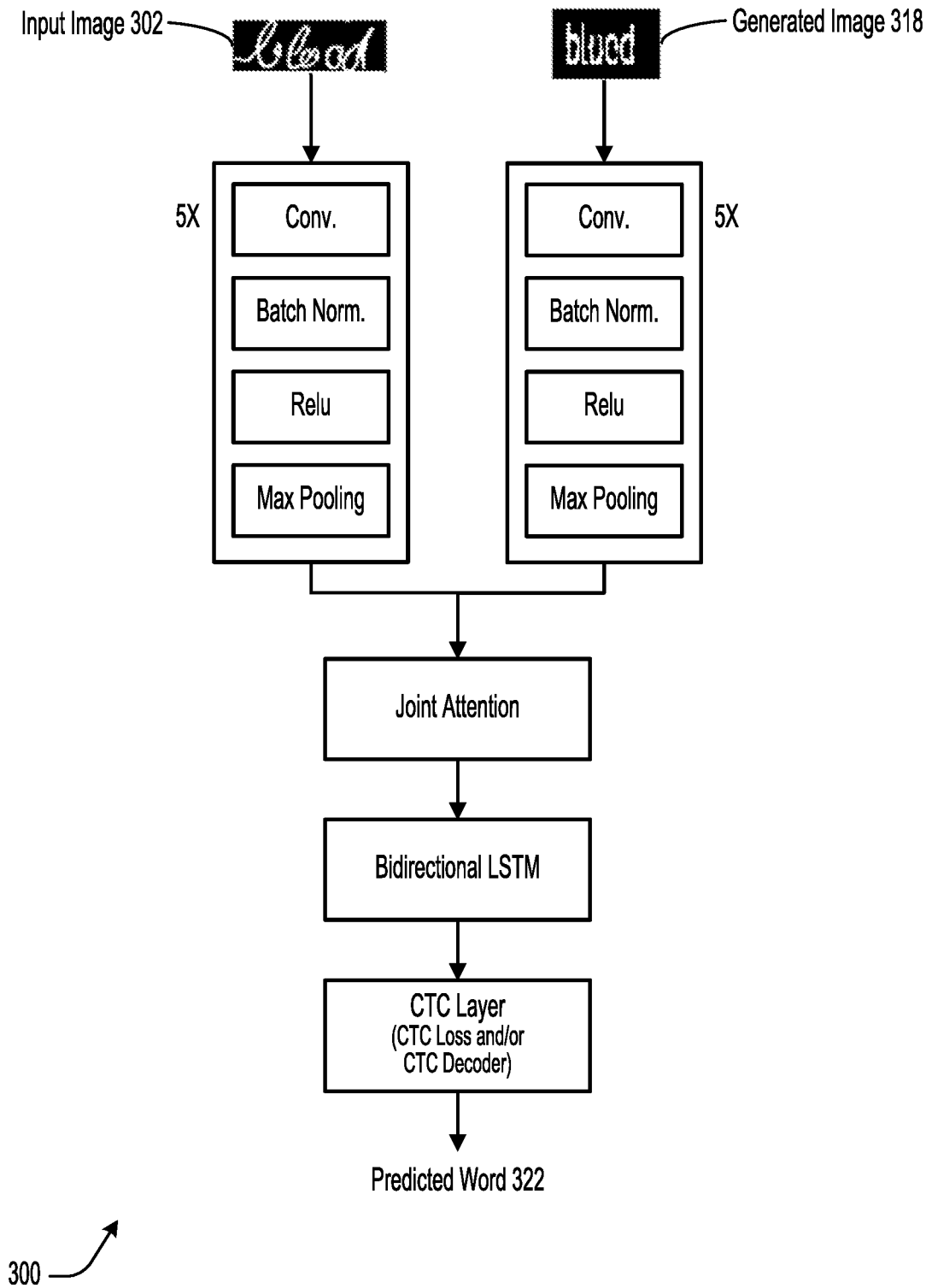
FIG. 3 illustrates an example of a model for joint attention handwritten recognition reinforced by a HW2MP-GAN model.

FIG. 3 illustrates an example of a model 300 for joint attention handwritten recognition reinforced by the HW2MP-GAN model, according to some embodiments of the present invention. Model 300 exploits both handwritten images and their HW2MP-GAN generated machine print ones for the handwritten recognition task. In some embodiments, the baseline model consists of convolutional neural network (CNN) layers followed by bidirectional long short term memory (LSTM) layers followed by a Connectionist Temporal Classification (CTC) loss (during training). Further, for posterior decoding of the CTC layer to predict the words, a word beam search algorithm can be utilized.

In some embodiments, model 300 includes two parallel series of convolutional layers followed by batch normalization, ReLU nonlinearity, and max pooling, which is repeated five times. These two paths of information can be merged together with a joint attention model followed by two layers of Bidirectional LSTMs and CTC loss (during training). The joint attention layer consists of two inputs: (1) features learned from handwritten images denoted by $H=(H_1, \ldots, H_i, \ldots, H_T) \in \mathcal{R}^{T+d_1}$ and (2) features learned from generated machine print images denoted by $P=(P_1, \ldots, P_i, \ldots, P_T) \in \mathcal{R}^{T+d_2}$ where T is the maximum length of word and $d_1$ and $d_2$ represent the number of features for handwritten images and generated machine images, respectively. Therefore, the joint attention layer can be formulated as:

$$N_{ij} = \tanh(H_i W P_j) \forall\, i, j \qquad (14)$$

$$\alpha_{ij} = \frac{\exp(N_{ij})}{\sum_k \exp(N_{ik})} \forall\, i, j$$

$$\hat{H}_i = \sum_j \alpha_{ij} P_j \forall\, i$$

$$A = Concat(H, \hat{H})$$

where $\alpha_{ij}$ represents the similarity between the $i^{th}$ handwritten image character and the $j^{th}$ generated machine print character. $\hat{H}_i$ is the projection features learned from the generated machine print image to the handwritten one through the attention model. Finally, the output of the attention layer, denoted by $A \in \mathcal{R}^{T \times (d_1+d_2)}$ is a concatenation of features of the handwritten images and their projected ones.

The HW2MP-GAN and the joint attention handwritten recognition models were evaluated on the IAM handwritten database, which contains 115,320 isolated and labeled words. 95% of the data was randomly chosen for training set and the remaining 5% for the test set. Because the IAM images have varying sizes, they were resized to 32×28 pixels. Further, all images were preprocessed by standardizing them to zero-mean and unit-variance.

The HW2MP-GAN was implemented as follows. The number of dual SWD blocks for word-level and character-level discriminators are $M^w$ and $M^c$, the batch size is b, the generator is G, the word-level discriminator is $D^w = [S_{d,1}^w \circ E^w, \ldots, S_{d,M^w}^w \circ E^w]^T$, the character-level discriminator is $D^c = [S_{d,1}^c \circ E^c, \ldots, S_{d,M^c}^c \circ E^c]^T$, the latent code dimension for the word-level and character-level discriminators are $r^w$ and $r^c$, respectively, the Lipschitz constants are $k^c$ and $k^w$, and the number of training steps is h. The implemented algorithm is described as follows (the first for loop corresponding to word-level and the second for loop corresponding to character-level):

```
1:   for iter = 1 ... n_max(h) do
2:     for t = 1 ... n_critic do
3:       Sample real data {x^(i), y^(i)}_{i=1}^m ~ P_r
4:       Sample noise {z^(i)}_{i=1}^m ~ p(z)
5:       Sample random number {ε_1^(i)}_{i=1}^m, {ε_2^(i)}_{i=1}^m ~ U[0, 1]
6:       {x̃^(i)}_{i=1}^m ← {G_θ(z^(i)|y^(i))}_{i=1}^m
7:       {x̂^(i)}_{i=1}^m ← {ε_1^(i) x^(i) + (1 − ε_1^(i))x̃^(i)}_{i=1}^m
8:       {x̄^(i)}_{i=1}^m ← {ε_2^(i) x^(i) + (1 − ε_2^(i))x̃^(i)}_{i=1}^m
9:       L^w is defined in Eq. (12)
```

10:
$$\theta^w \leftarrow \text{Adam}\left(\nabla_{\theta^w} \frac{1}{m}\sum_{i=1}^m L^w, \theta^w, \alpha, \beta_1, \beta_2\right)$$

```
11:    end for
12:    for t = 1 ... n_critic do
13:      Sample real character data {x^{c,(i)}}_{i=1}^m ~ P_r
14:      Sample noise {z^(i)}_{i=1}^m ~ p(z)
15:      Sample random number {ε_1^(i)}_{i=1}^m, {ε_2^(i)}_{i=1}^m ~ U[0, 1]
16:      {x̃^{c,(i)}}_{i=1}^m ← {G_θ(z^(i))}_{i=1}^m
17:      {x̂^{c,(i)}}_{i=1}^m ← {ε_1^(i) x^{c,(i)} + (1 − ε_1^(i))x̃^{c,(i)}}_{i=1}^m
18:      {x̄^{c,(i)}}_{i=1}^m ← {ε_2^(i) x^{c,(i)} + (1 − ε_2^(i))x̃^{c,(i)}}_{i=1}^m
19:      L^c is defined in Eq. (11)
```

20:
$$\theta^c \leftarrow \text{Adam}\left(\nabla_{\theta^c} \frac{1}{m}\sum_{i=1}^m L^c, \theta^c, \alpha, \beta_1, \beta_2\right)$$

```
21:    end for
22:    Sample a batch of noises {z^(i)}_{i=1}^m ~ p(z)
23:    L^total is defined in Eq. (13)
```

24:
$$\theta^g \leftarrow \text{Adam}\left(\nabla_{\theta^g} \frac{1}{m}\sum_{i=1}^m L^{total}, \theta^g, \alpha, \beta_1, \beta_2\right)$$

```
25:  end for
```

As described above, training of the HW2MP-GAN model utilizes handwritten text images and corresponding manually generated machine print forms (i.e., "real" machine print images), which can be created through the ground truth labeled words. Since machine print images contain individual characters, they are used to calculate the character-level model loss. Because the "real" machine print images are created manually, the position of each character is known. Because the number of characters in words varies, only real or generated characters are extracted and the background is ignored by enforcing loss zero for the backgrounds.

For a comprehensive evaluation of the model against the state-of-art generative models, three metrics were considered for the image-to-image translation problem and the handwriting text recognition task. Frechet Inception Distance (FID) is the state-of-the-art metric for evaluating the performance of the image-to-image generative models. It compares distances between a pair of Inception embedding features from real and generated images. In the present disclosure, the FID score is extended to the Frechet Handwritten Distance (FHD) to calculate the distance between embedded features of the real and model generated text images. The embedded features are computed from the output of the bidirectional LSTM layers of the pre-trained handwritten recognition model. FHD=0 corresponds to the embedded features being identical. For the handwriting text recognition task, the average Levenshtein distance was used (LD=0 being the best) and word accuracy (100% being the best).

The generator's architecture of the HW2MP-GAN comprises a U-Net model with five layers of encoder and decoder each, where the encoder and decoder are interconnected through skip connections. The character-level and word-level encoders embed images to $r^w=128$ and $r^c=32$ features respectively. $M^c=M^w=4$ SWD blocks were used for both the character-level and the word-level discriminators. Hyper-parameters were chosen based on a grid search over a limited set and the results can be further improved by increasing the search space of hyper-parameters. $\lambda_{char}=2$, $\lambda_{recons}=100$, $\lambda_1^c=\lambda_1^w=20$ and $\lambda_2^c=\lambda_2^w=10$ were chosen. The Adam optimizer with an initial learning rate of 0.0001 was used for training the generator and the two discriminators.

The experiments included (1) measuring the distance between real machine print images and HW2MP-GAN generated text images, and (2) the legibility of HW2MP-GAN generated text images. To evaluate the legibility, a pre-trained handwriting recognition model was used to recognize the HW2MP-GAN generated text images. The HW2MP-GAN model was compared with state-of-the-art GANs including DCGAN, LSGAN, WGAN, WGAN-GP, CTGAN, SWGAN, and Pix2Pix. In order to put these GANs (except Pix2Pix) in the framework of converting handwriting text images to machine print ones, they were extended to conditional GANs by embedding handwritten images to latent space and then concatenating them with noise for machine print generation.

The results of the IAM dataset evaluation based on the three metrics of FHD, average LD, and word accuracy are shown in the following table.

| Model | FHD | Ave. LD | Word Accuracy |
|---|---|---|---|
| WGAN | 874.76 | 1.57 | 0.12% |
| Pix2Pix | 814.24 | 0.85 | 5.34% |
| WGAN-GP | 68.57 | 0.92 | 16.82% |
| CTGAN | 51.55 | 0.92 | 15.48% |
| SWGAN | 60.78 | 0.94 | 14.94% |
| Proposed Method | 21.42 | 0.36 | 55.36% |

Based on these results, the models can be categorized into four groups. In group (1), DCGAN and LSGAN models didn't converge due to gradient vanishing problem. In group (2), WGAN and Pix2Pix models were better than group (1) since they have improved the GAN model through a better distance metric (Wasserstein in comparison to JS) and better architecture (U-Net model) but have the worst performances compared to the three other models. In group (3), WGAN-GP, CT-GAN and SWGAN turned out to be the best baseline models which have comparable results among themselves and outperformed other baseline models. These models either have better Wasserstein distance approximation (SW-GAN) or better enforcing of Lipschitz continuity constraint (WGAN-GP and CTGAN). The HW2MP-GAN model outperformed the other models by a large margin for all three of the metrics that were evaluated. The superior performance of the HW2MP-GAN is due to the three-component game, exploiting the SWD distance, the U-Net architecture, and the L1 reconstruction loss. However, none of these factors considering alone led to this improvement since for example U-Net architecture and L1 reconstruction loss exist in Pix2Pix model and the SWD distance exists in SWGAN.

Figure 4:
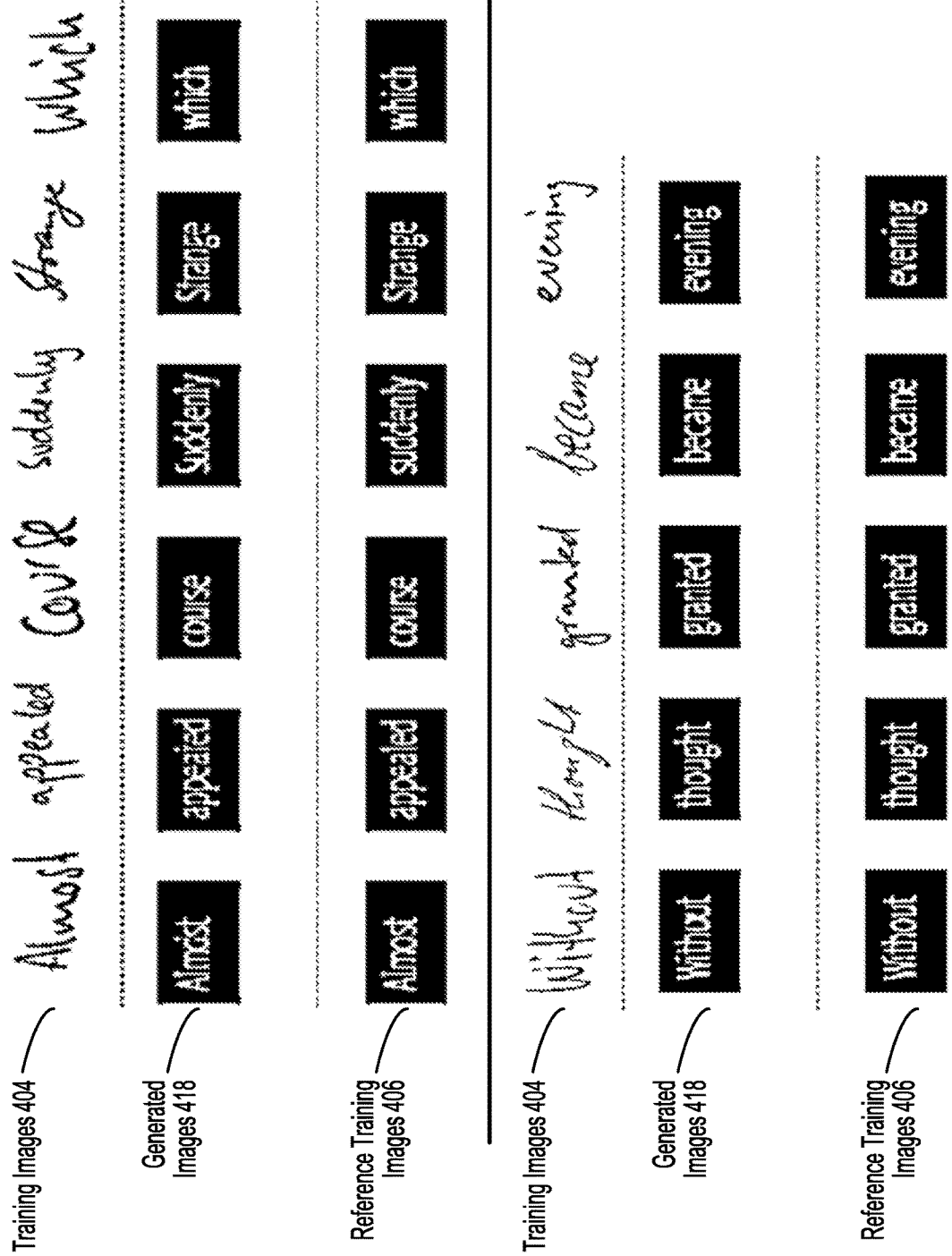
FIG. 4 illustrates examples of training images, generated images, and reference training images.

FIG. 4 illustrates examples of training images 404, generated images 418, and reference training images 406, according to some embodiments of the present invention. It can be observed that generated machine print images (e.g., generated images 418) are very similar to the "real" machine print ones (e.g., reference training images 406). Some errors have been noticed in generating machine print images including, for example, "d" instead of "o" in the word "Almost", "r" instead of "l" in the word "appealed", and "u" instead of "o" in the word "without". All these characters drawn mistakenly are similar to each other, which can make it challenging for the generative models.

Figure 5A:
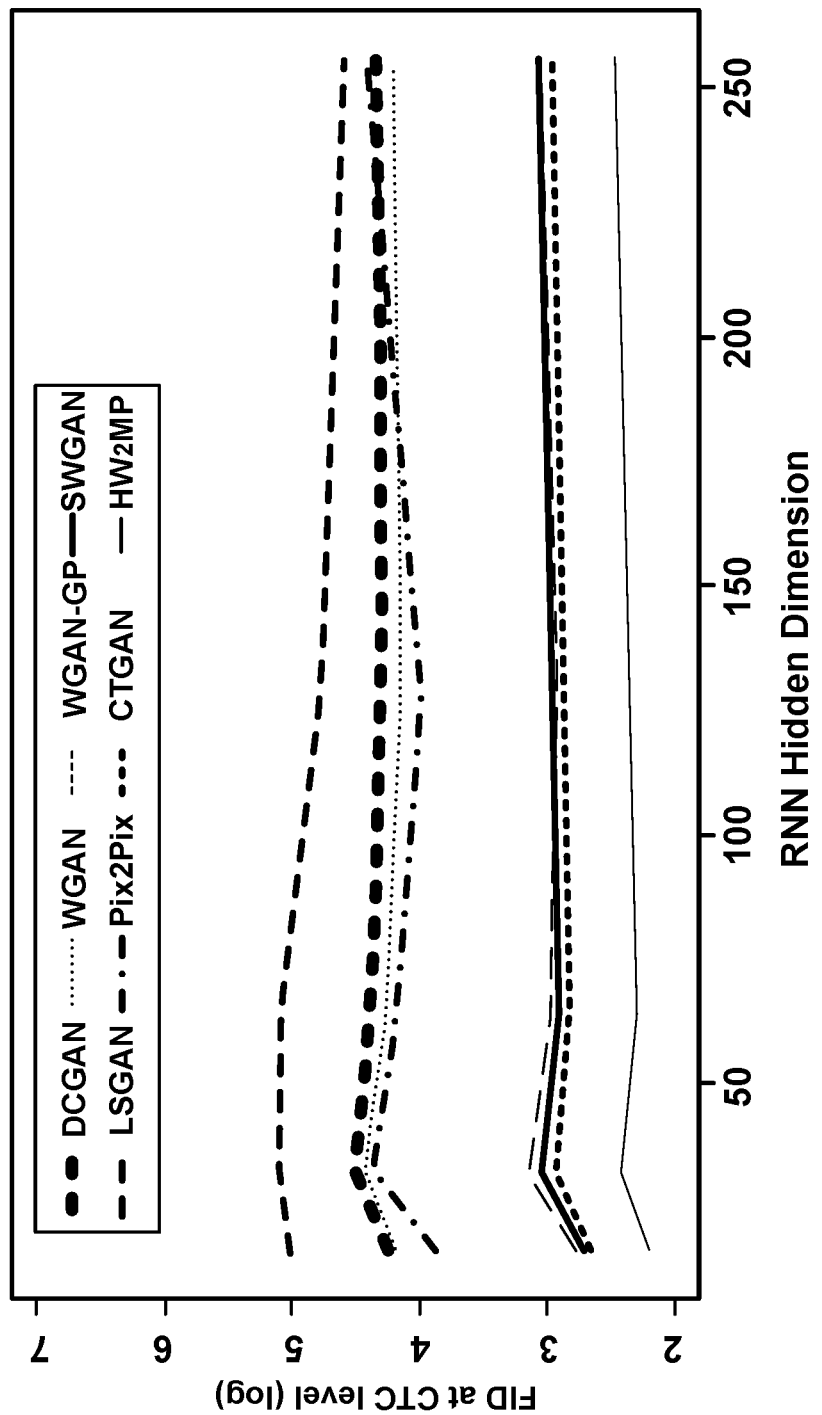
FIGS. 5A-5C show results for the FHD, average LD, and word accuracy metrics, respectively, using different bidirectional LSTM's hidden dimensions in pretrained handwritten recognition models.
Figure 5B:
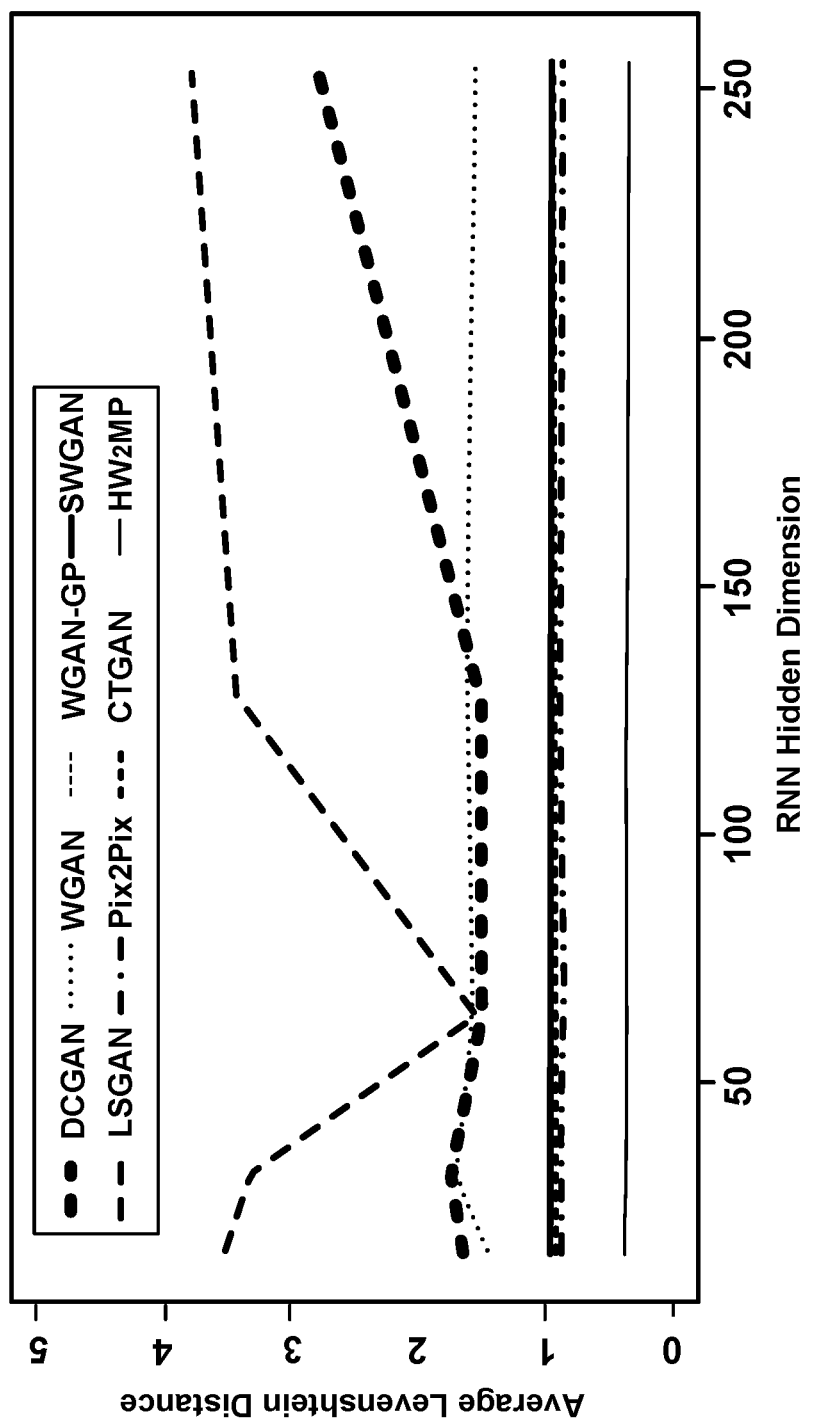
Figure 5C:
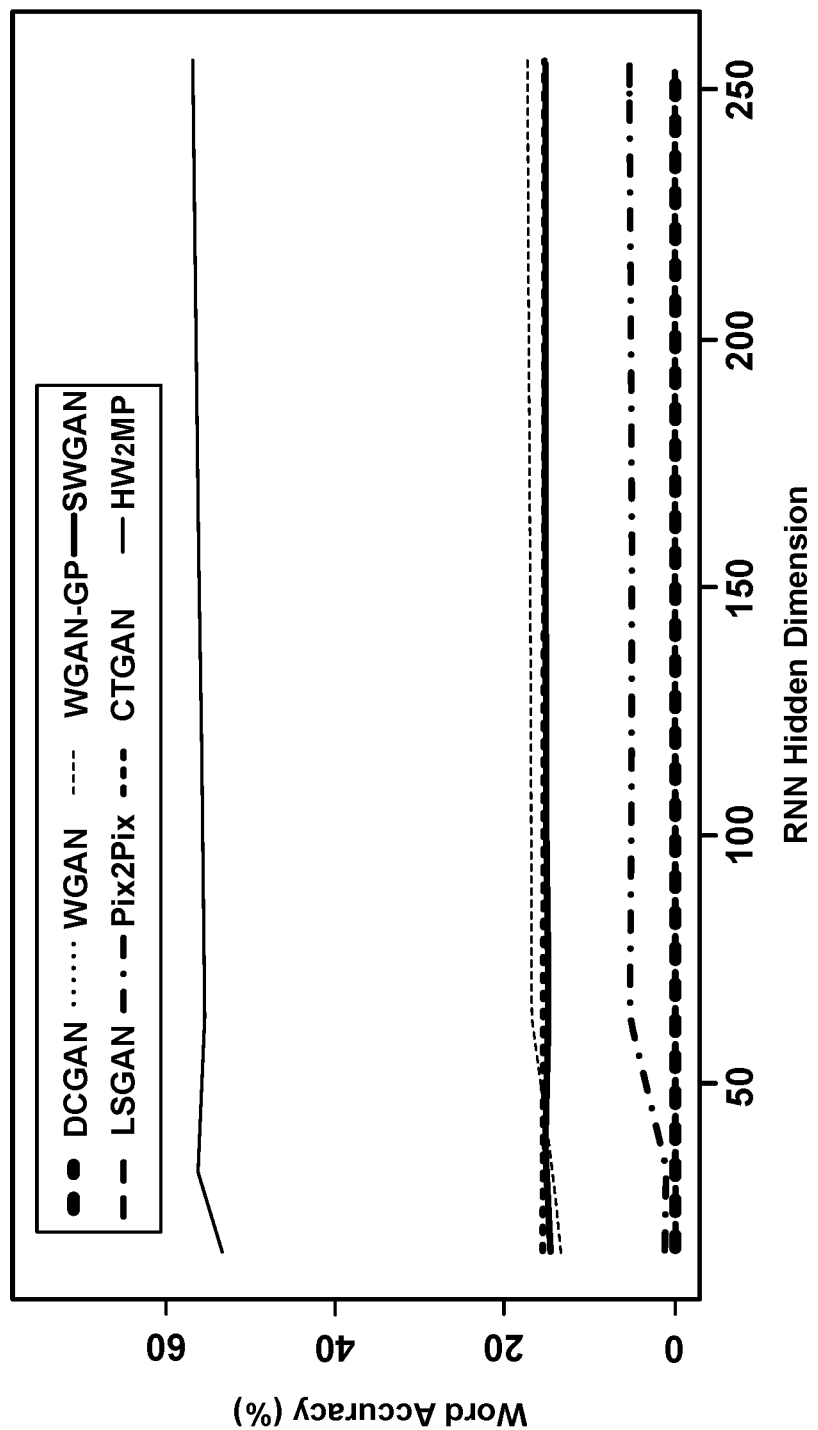

FIGS. 5A-5C show results for the FHD, average LD, and word accuracy metrics, respectively, using different bidirectional LSTM's hidden dimensions in pretrained handwritten recognition models. From these results, it can be observed that the HW2MP model consistently outperforms baselines. In FIGS. 5A-5C, the hidden dimensions {16, 32, 64, 128, 256} were used and results show that (1) HW2MP-GAN, SWGAN, CTGAN, and WGAN-GP models maintain consistency in their performance and (2) HW2MP-GAN was superior over all of them for all the hidden dimensions.

The performance of the proposed attention-based handwritten recognition on the IAM dataset was also evaluated. The proposed model was compared against the baselines, including handwritten recognition models trained by handwritten images alone or generated machine print only. The table below shows that the recognition model trained by handwritten text images gains a word accuracy of 84.08% and 0.08 average LD, and 62.12% word accuracy and 0.3 average LD by only machine print. Next, the proposed model trained using both results in 85.4% word accuracy and 0.07 average LD. These results demonstrate the potential of exploiting the generated machine print images as an extra source of information to further boost the handwritten recognition task.

| Model | Ave. LD | Word Accuracy |
| --- | --- | --- |
| Handwritten images | 0.08 | 84.08% |
| Generated machine print images only | 0.30 | 62.12% |
| Generated machine print + handwritten images | 0.07 | 85.4% |

Figure 6:
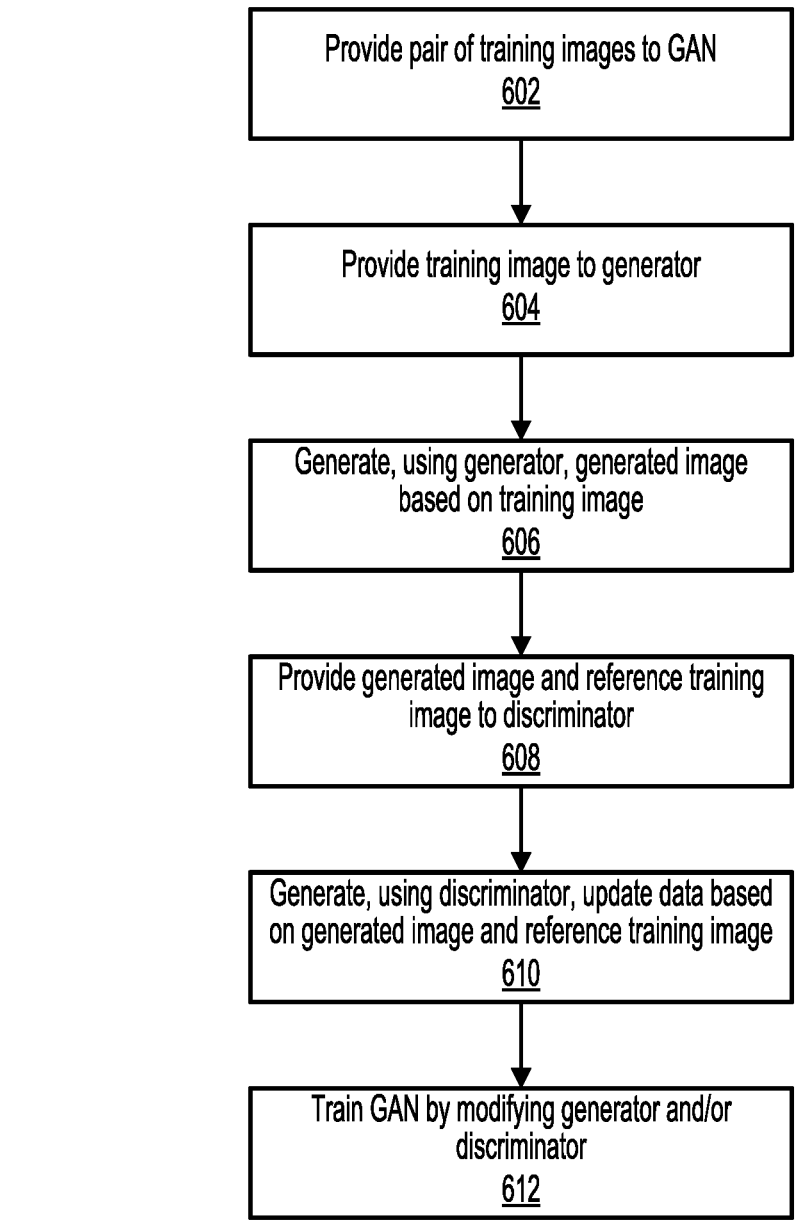
FIG. 6 illustrates a method of training a GAN to perform an image-to-image transformation for recognizing text.

FIG. 6 illustrates a method 600 of training a GAN to perform an image-to-image transformation for recognizing text, according to some embodiments of the present invention. One or more steps of method 600 may be omitted during performance of method 600, and steps of method 600 need not be performed in the order shown. One or more steps of method 600 may be performed by one or more processors. Method 600 may be implemented as a computer-readable medium or computer program product comprising instructions which, when the program is executed by one or more computers, cause the one or more computers to carry out the steps of method 600. Such computer program products can be transmitted, over a wired or wireless network, in a data carrier signal carrying the computer program product.

At step 602, a pair of training images (e.g., pair of training images 208) are provided to a GAN (e.g., GAN 210). The GAN may include an encoder (e.g., encoder 228) and a decoder (e.g., decoder 230). The pair of training images may include a training image (e.g., training images 204, 404) containing a set of characters in handwritten form and a reference training image (e.g., reference training images 206, 406) containing the set of characters in machine-recognizable form. The GAN may include a generator (e.g., generator 212) and a discriminator. In some embodiments, the discriminator may be a word-level discriminator (e.g., word-level discriminator 214). In some embodiments, the discriminator may be a character-level discriminator (e.g., character-level discriminator 216). In some embodiments, the discriminator may be a first discriminator, and the GAN may include a second discriminator. The first discriminator may be the word-level discriminator and the second discriminator may be the character-level discriminator, or vice versa.

At step 604, the training image is provided to the generator.

At step 606, a generated image (e.g., generated images 218, 318, 418) is generated using the generator based on the training image. The generated image may include the set of characters or a set of generated characters that are similar to the set of characters. For example, the set of generated characters may attempt to replicate the set of characters.

At step 608, the generated image and the reference training image are provided to the discriminator.

At step 610, update data (e.g., update data 232) is generated using the discriminator based on the generated image and the reference training image. The update data may include word-level update data (e.g., word-level update data 232-1) and/or character-level update data (e.g., character-level update data 232-2). For example, if the discriminator is the word-level discriminator, the update data may include the word-level update data, or if the discriminator is the character-level discriminator, the update data may include the character-level update data. In some embodiments, the update data is calculated or is set based on a loss function, which may be calculated using the word-level discriminator and/or the character-level discriminator or the outputs thereof.

At step 612, the GAN is trained by modifying one or both of the generator and the discriminator using the update data. Modifying the generator may include adjusting the weights and/or parameters of the encoder and/or decoder of the generator. Modifying the discriminator may include adjusting the weights and/or parameters of the discriminator. In some embodiments, the GAN is trained over multiple training iterations. For example, steps 602 through steps 612 may correspond to a single training iteration. During each additional training iteration, steps 602 through steps 612 may be repeated using a new pair of training images (or a new batch of training image pairs) including a new training image and a new reference training image.

Figure 7:
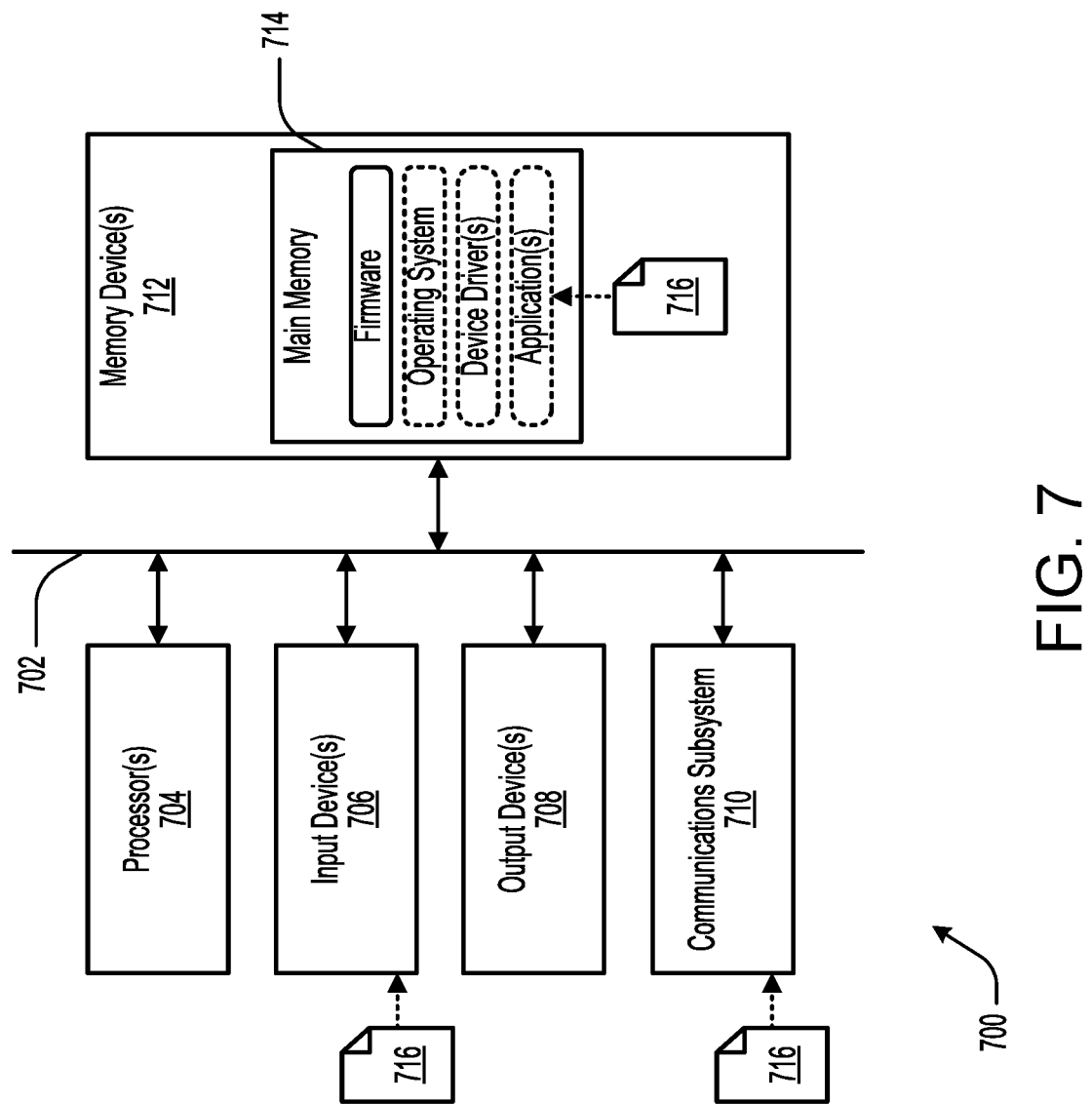
FIG. 7 illustrates an example computer system.

FIG. 7 illustrates an example computer system 700 comprising various hardware elements, according to some embodiments of the present invention. Computer system 700 may be incorporated into or integrated with devices described herein and/or may be configured to perform some or all of the steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

In the illustrated example, computer system 700 includes a communication medium 702, one or more processor(s) 704, one or more input device(s) 706, one or more output device(s) 708, a communications subsystem 710, and one or more memory device(s) 712. Computer system 700 may be implemented using various hardware implementations and embedded system technologies. For example, one or more elements of computer system 700 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device such as an SoC FPGA, among other possibilities.

The various hardware elements of computer system 700 may be coupled via communication medium 702. While communication medium 702 is illustrated as a single connection for purposes of clarity, it should be understood that communication medium 702 may include various numbers and types of communication media for transferring data between hardware elements. For example, communication medium 702 may include one or more wires (e.g., conductive traces, paths, or leads on a printed circuit board (PCB) or integrated circuit (IC), microstrips, striplines, coaxial cables, etc.), one or more optical waveguides (e.g., optical fibers, strip waveguides, etc.), one or more wireless connections or links (e.g., infrared wireless communication, radio communication, microwave wireless communication, etc.), among other possibilities.

In some embodiments, communication medium 702 may include one or more buses connecting pins of the hardware elements of computer system 700. For example, communication medium 702 may include a bus connecting processor(s) 704 with main memory 714, referred to as a system bus, and a bus connecting main memory 714 with input device(s) 706 or output device(s) 708, referred to as an expansion bus. The system bus may consist of several elements, including an address bus, a data bus, and a control bus. The address bus may carry a memory address from processor(s) 704 to the address bus circuitry associated with main memory 714 in order for the data bus to access and carry the data contained at the memory address back to processor(s) 704. The control bus may carry commands from processor(s) 704 and return status signals from main memory 714. Each bus may include multiple wires for carrying multiple bits of information and each bus may support serial or parallel transmission of data.

Processor(s) 704 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 704 may include one or more multi-core processors, in which each core may read and execute program instructions simultaneously with the other cores.

Input device(s) 706 may include one or more of various user input devices such as a mouse, a keyboard, a microphone, etc., as well as various sensor input devices, such as an image capture device, a pressure sensor (e.g., barometer, tactile sensor, etc.), a temperature sensor (e.g., thermometer, thermocouple, thermistor, etc.), a movement sensor (e.g., accelerometer, gyroscope, tilt sensor, etc.), a light sensor (e.g., photodiode, photodetector, charge-coupled device, etc.), and/or the like. Input device(s) 706 may also include devices for reading and/or receiving removable storage devices or other removable media. Such removable media may include optical discs (e.g., Blu-ray discs, DVDs, CDs, etc.), memory cards (e.g., CompactFlash card, Secure Digital (SD) card, Memory Stick, etc.), floppy disks, Universal Serial Bus (USB) flash drives, external hard disk drives (HDDs) or solid-state drives (SSDs), and/or the like.

Output device(s) 708 may include one or more of various devices that convert information into human-readable form, such as without limitation a display device, a speaker, a printer, and/or the like. Output device(s) 708 may also include devices for writing to removable storage devices or other removable media, such as those described in reference to input device(s) 706. Output device(s) 708 may also include various actuators for causing physical movement of one or more components. Such actuators may be hydraulic, pneumatic, electric, etc., and may be provided with control signals by computer system 700.

Communications subsystem 710 may include hardware components for connecting computer system 700 to systems or devices that are located external computer system 700, such as over a computer network. In various embodiments, communications subsystem 710 may include a wired communication device coupled to one or more input/output ports (e.g., a universal asynchronous receiver-transmitter (UART), etc.), an optical communication device (e.g., an optical modem, etc.), an infrared communication device, a radio communication device (e.g., a wireless network interface controller, a BLUETOOTH® device, an IEEE 802.11 device, a Wi-Fi device, a Wi-Max device, a cellular device, etc.), among other possibilities.

Memory device(s) 712 may include the various data storage devices of computer system 700. For example, memory device(s) 712 may include various types of computer memory with various response times and capacities, from faster response times and lower capacity memory, such as processor registers and caches (e.g., L0, L1, L2, etc.), to medium response time and medium capacity memory, such as random access memory, to lower response times and lower capacity memory, such as solid state drives and hard drive disks. While processor(s) 704 and memory device(s) 712 are illustrated as being separate elements, it should be understood that processor(s) 704 may include varying levels of on-processor memory such as processor registers and caches that may be utilized by a single processor or shared between multiple processors.

Memory device(s) 712 may include main memory 714, which may be directly accessible by processor(s) 704 via the memory bus of communication medium 702. For example, processor(s) 704 may continuously read and execute instructions stored in main memory 714. As such, various software elements may be loaded into main memory 714 to be read and executed by processor(s) 704 as illustrated in FIG. 7. Typically, main memory 714 is volatile memory, which loses all data when power is turned off and accordingly needs power to preserve stored data. Main memory 714 may further include a small portion of non-volatile memory containing software (e.g., firmware, such as BIOS) that is used for reading other software stored in memory device(s) 712 into main memory 714. In some embodiments, the volatile memory of main memory 714 is implemented as random-access memory (RAM), such as dynamic RAM (DRAM), and the non-volatile memory of main memory 714 is implemented as read-only memory (ROM), such as flash memory, erasable programmable read-only memory (EPROM), or electrically erasable programmable read-only memory (EEPROM).

Computer system 700 may include software elements, shown as being currently located within main memory 714, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 716 executable by computer system 700. In one example, such instructions 716 may be received by computer system 700 using communications subsystem 710 (e.g., via a wireless or wired signal carrying instructions 716), carried by communication medium 702 to memory device(s) 712, stored within memory device(s) 712, read into main memory 714, and executed by processor(s) 704 to perform one or more steps of the described methods. In another example, instructions 716 may be received by computer system 700 using input device(s) 706 (e.g., via a reader for removable media), carried by communication medium 702 to memory device(s) 712, stored within memory device(s) 712, read into main memory 714, and executed by processor(s) 704 to perform one or more steps of the described methods.

In some embodiments of the present disclosure, instructions 716 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 700. For example, the non-transitory computer-readable medium may be one of memory device(s) 712, as shown in FIG. 7 with instructions 716 being stored within memory device(s) 712. In some cases, the non-transitory computer-readable medium may be separate from computer system 700. In one example, the non-transitory computer-readable medium may a removable media provided to input device(s) 706, such as those described in reference to input device(s) 706, as shown in FIG. 7 with instructions 716 being provided to input device(s) 706. In another example, the non-transitory computer-readable medium may a component of a remote electronic device, such as a mobile phone, that may wirelessly transmit a data signal carrying instructions 716 to computer system 700 using communications subsystem 716, as shown in FIG. 7 with instructions 716 being provided to communications subsystem 710.

Instructions 716 may take any suitable form to be read and/or executed by computer system 700. For example, instructions 716 may be source code (written in a human-readable programming language such as Java, C, C++, C#, Python, etc.), object code, assembly language, machine code, microcode, executable code, and/or the like. In one example, instructions 716 are provided to computer system 700 in the form of source code, and a compiler is used to translate instructions 716 from source code to machine code, which may then be read into main memory 714 for execution by processor(s) 704. As another example, instructions 716 are provided to computer system 700 in the form of an executable file with machine code that may immediately be read into main memory 714 for execution by processor(s) 704. In various examples, instructions 716 may be provided to computer system 700 in encrypted or unencrypted form, compressed or uncompressed form, as an installation package or an initialization for a broader software deployment, among other possibilities.

In one aspect of the present disclosure, a system (e.g., computer system 700) is provided to perform methods in accordance with various embodiments of the present disclosure. For example, some embodiments may include a system comprising one or more processors (e.g., processor(s) 704) that are communicatively coupled to a non-transitory computer-readable medium (e.g., memory device(s) 712 or main memory 714). The non-transitory computer-readable medium may have instructions (e.g., instructions 716) stored therein that, when executed by the one or more processors, cause the one or more processors to perform the methods described in the various embodiments.

In another aspect of the present disclosure, a computer-program product that includes instructions (e.g., instructions 716) is provided to perform methods in accordance with various embodiments of the present disclosure. The computer-program product may be tangibly embodied in a non-transitory computer-readable medium (e.g., memory device(s) 712 or main memory 714). The instructions may be configured to cause one or more processors (e.g., processor(s) 704) to perform the methods described in the various embodiments.

In another aspect of the present disclosure, a non-transitory computer-readable medium (e.g., memory device(s) 712 or main memory 714) is provided. The non-transitory computer-readable medium may have instructions (e.g., instructions 716) stored therein that, when executed by one or more processors (e.g., processor(s) 704), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of training a generative adversarial network (GAN) to perform an image-to-image transformation for recognizing text, the method comprising:
   providing a pair of training images to the GAN, the pair of training images including a training image containing a set of characters in handwritten form and a reference training image containing the set of characters in machine-recognizable form, wherein the GAN includes a generator, a word-level discriminator, and a character-level discriminator, wherein the word-level discriminator is separate from the character-level discriminator;
   providing the training image to the generator;
   generating, using the generator, a generated image based on the training image;
   providing the generated image and the reference training image to the word-level discriminator and to the character-level discriminator;
   generating, using the word-level discriminator and the character-level discriminator, update data based on the generated image and the reference training image, the update data comprising (i) word-level update data generated by providing the generated image and the reference training image to the word-level discriminator and (ii) character-level update data generated by providing the generated image and the reference training image to the character-level discriminator; and
   training the GAN by modifying at least one of the generator, the word-level discriminator, or the character-level discriminator using the update data.

2. The method of claim 1, further comprising:
   separating the generated image for and based on each of the set of characters; and
   separating the reference training image for each of the set of characters.

3. The method of claim 2, further comprising:
   providing the separated generated image and the separated reference training image to the character-level discriminator;
   generating, using the character-level discriminator, character-level update data based on the separated generated image and the separated reference training image, wherein the GAN is trained using the character-level update data.

4. The method of claim 1, wherein the generator is further provided with a random input, and wherein the generated image is generated further based on the random input.

5. The method of claim 1, further comprising:
   providing additional pairs of training images;
   generating additional update data using the additional pairs of training images; and
   training the GAN by modifying at least one of the generator, the word-level discriminator, or the character-level discriminator using the additional update data.

6. A non-transitory computer-readable medium comprising instructions that, when executed by one or more processors, cause the one or more processors to perform operations comprising:
   providing a pair of training images to a generative adversarial network (GAN), the pair of training images including a training image containing a set of characters in handwritten form and a reference training image containing the set of characters in machine-recognizable form, wherein the GAN includes a generator, a word-level discriminator, and a character-level discriminator, wherein the word-level discriminator is separate from the character-level discriminator;
   providing the training image to the generator;
   generating, using the generator, a generated image based on the training image;
   providing the generated image and the reference training image to the word-level discriminator and the character-level discriminator;
   generating, using the word-level discriminator and the character-level discriminator, update data based on the generated image and the reference training image the update data comprising (i) word-level update data generated by providing the generated image and the reference training image to the word-level discriminator and (ii) character-level update data generated by providing the generated image and the reference training image to the character-level discriminator; and
   training the GAN by modifying at least one of the generator, the word-level discriminator, or the character-level discriminator using the update data.

7. The non-transitory computer-readable medium of claim 6, further comprising:
   separating the generated image for and based on each of the set of characters; and
   separating the reference training image for each of the set of characters.

8. The non-transitory computer-readable medium of claim 7, further comprising:
   providing the separated generated image and the separated reference training image to the character-level discriminator;
   generating, using the character-level discriminator, character-level update data based on the separated generated image and the separated reference training image, wherein the GAN is trained using the character-level update data.

9. The non-transitory computer-readable medium of claim 6, wherein the generator is further provided with a random input, and wherein the generated image is generated further based on the random input.

10. The non-transitory computer-readable medium of claim 6, further comprising:
    providing additional pairs of training images;
    generating additional update data using the additional pairs of training images; and
    training the GAN by modifying at least one of the generator, the word-level discriminator, or the character-level discriminator using the additional update data.

11. A system comprising:
    one or more processors; and
    a computer-readable medium comprising instructions that, when executed by the one or more processors, cause the one or more processors to perform operations comprising:
        providing a pair of training images to a generative adversarial network (GAN), the pair of training images including a training image containing a set of characters in handwritten form and a reference training image containing the set of characters in machine-recognizable form, wherein the GAN includes a generator, a word-level discriminator, and a character-level discriminator, wherein the word-level discriminator is separate from the character-level discriminator;
providing the training image to the generator;
generating, using the generator, a generated image based on the training image;
providing the generated image and the reference training image to the word-level discriminator and the character-level discriminator;
generating, using the word-level discriminator and the character-level discriminator, update data based on the generated image and the reference training image, the update data comprising (i) word-level update data generated by providing the generated image and the reference training image to the word-level discriminator and (ii) character-level update data generated by providing the generated image and the reference training image to the character-level discriminator; and
training the GAN by modifying at least one of the generator, the word-level discriminator, or the character-level discriminator using the update data.

12. The system of claim 11, further comprising:
separating the generated image for and based on each of the set of characters; and
separating the reference training image for each of the set of characters.

13. The system of claim 12, further comprising:
providing the separated generated image and the separated reference training image to the character-level discriminator;
generating, using the character-level discriminator, character-level update data based on the separated generated image and the separated reference training image, wherein the GAN is trained using the character-level update data.

14. The system of claim 11, further comprising:
providing additional pairs of training images;
generating additional update data using the additional pairs of training images; and
training the GAN by modifying at least one of the generator, the word-level discriminator, or the character-level discriminator using the additional update data.

* * * * *